US006834673B2

(12) United States Patent
Robinson et al.

(10) Patent No.: US 6,834,673 B2
(45) Date of Patent: Dec. 28, 2004

(54) PUMP MODULE WITH PRESSURE REGULATOR

(75) Inventors: Barry S. Robinson, Williamsburg, VA (US); James A. Wynn, Jr., Virginia Beach, VA (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 172 days.

(21) Appl. No.: 10/323,765

(22) Filed: Dec. 20, 2002

(65) Prior Publication Data

US 2004/0118461 A1 Jun. 24, 2004

(51) Int. Cl.[7] ......................... F16K 21/04; F16K 31/12; F02M 21/00

(52) U.S. Cl. .................. 137/565.13; 137/510; 123/463; 123/510; 123/514; 123/549

(58) Field of Search ................................ 137/510, 549; 123/463, 510, 514

(56) References Cited

U.S. PATENT DOCUMENTS 4,237,924 A * 12/1980 Benjamin et al. ........... 137/510
5,076,320 A * 12/1991 Robinson ................. 137/454.2
5,078,167 A * 1/1992 Brandt et al. ............... 137/549
5,458,104 A 10/1995 Tuckey
5,785,080 A * 7/1998 Herbst ........................ 137/510
5,967,120 A * 10/1999 Blanton et al. ............. 123/467
6,016,831 A 1/2000 Bueser et al.
6,098,652 A * 8/2000 Brandt .................. 137/315.05
6,161,574 A * 12/2000 Gerhard et al. ............. 137/510

* cited by examiner

*Primary Examiner*—A. Michael Chambers

(57) ABSTRACT

A pump module for mounting in a fuel tank of an automotive fuel supply system includes a housing, a fuel pump mounted in the housing, a pressure regulator conduit mounted in the housing, and a pressure regulator. The housing includes a module inlet and a module outlet in fluid communication with the module inlet. The fuel pump is in fluid communication with the module inlet. The pressure regulator conduit is in fluid communication with the fuel pump. The pressure regulator conduit includes a regulator inlet, regulator outlet, and a receptacle in fluid communication with the regulator inlet and the regulator outlet. The receptacle includes a first surface surrounding an axis, and a second surface surrounding the axis and the first surface to provide a void between the first surface and the second surface. The pressure regulator is mounted in the receptacle to selectively open fluid communication between the regulator inlet and the regulator outlet. The pressure regulator extends into the void between the first surface of the receptacle and the second surface of the receptacle. The pressure regulator includes a third surface surrounding the axis, and a fourth surface surrounding the axis and the third surface. A first seal engages the first surface of the receptacle and the third surface of the pressure regulator and a second seal engages the second surface of the receptacle and the fourth surface of the pressure regulator.

15 Claims, 5 Drawing Sheets

PUMP MODULE WITH PRESSURE REGULATOR

BACKGROUND OF THE INVENTION

It is believed that fuel pressure regulators relieve over-pressures in the fuel supply line extending between the fuel tank and the internal combustion engine. This fuel pressure regulation maintains the fuel pressure supplied to the fuel injectors at or below a prescribed value.

It is believed that over-pressures in the fuel supply line are caused by at least two sources. The first source includes fuel pressure pulses generated by the fuel pump sending pressurized fuel from the fuel tank to the fuel injectors. The second source includes unintended restrictions in the fuel supply line such as crimps or debris blockages.

SUMMARY OF THE INVENTION

There is provided a pump module for mounting in a fuel tank of an automotive fuel supply system including a housing, a pump, and a pressure regulator. The housing includes a module inlet, a module outlet, and a pressure regulator conduit. The pressure regulator conduit includes a regulator inlet, regulator outlet, and a receptacle in fluid communication with the regulator inlet and the regulator outlet. The receptacle includes a first surface surrounding an axis, and a second surface surrounding the axis and the first surface to provide a void between the first surface and the second surface. The pressure regulator is mounted in the receptacle to selectively open fluid communication between the regulator inlet and the regulator outlet. The pressure regulator extends into the void between the first surface of the receptacle and the second surface of the receptacle. The pressure regulator includes a third surface surrounding the axis, and a fourth surface surrounding the axis and the third surface. A first seal engages the first surface of the receptacle and the third surface of the pressure regulator and a second seal engages the second surface of the receptacle and the fourth surface of the pressure regulator. The fuel pump is mounted in the housing and in fluid communication with the module inlet, the module outlet and the regulator inlet.

There is also provided a pump module for mounting in a fuel tank of an automotive fuel supply system including a housing, a pump, and a fuel pressure regulator. The housing includes a module inlet, a module outlet, and a pressure regulator conduit. The pressure regulator conduit includes a regulator inlet, a receptacle in fluid communication with the regulator inlet, and a regulator outlet extending along an axis into the receptacle. The pump is mounted in the housing and in fluid communication with the module inlet, the module outlet and the regulator inlet. The fuel pressure regulator is sealingly mounted within the receptacle to selectively open and close fluid communication between the regulator inlet and the regulator outlet. The fuel pressure regulator includes a first housing member, and a second housing member and a closing member. The second housing member is connected to the first housing member and in fluid communication with the regulator inlet. The second housing member including a continuous wall including a base, a recess, an opening in the recess coaxial with the regulator outlet a seat adjacent the opening, and a second surface. The recess receives the regulator outlet and includes a first surface surrounding the axis. The opening is in fluid communication with the regulator outlet. The seat surrounds the opening and the second surface surrounds the axis and the first surface. The closing member is movably contained within the first housing member and the second housing member and selectively engageable with the seat to fluidly seal the opening. A first seal engages the regulator outlet and the first seal surface and a second seal engages the receptacle and the second surface.

BRIEF DESCRIPTIONS OF THE DRAWINGS

The accompanying drawings, which are incorporated herein and constitute part of this specification, illustrate an embodiment of the invention, and, together with the general description given above and the detailed description given below, serve to explain the features of the invention.

FIG. 1 is a schematic representation of a fuel supply system including a first embodiment of a pump module according to the invention.

FIG. 2 a cross-sectional view of a pump module according to a first embodiment of the invention.

DETAILED DESCRIPTION OF THE PREFERRED EMBODIMENTS

Figure 1:
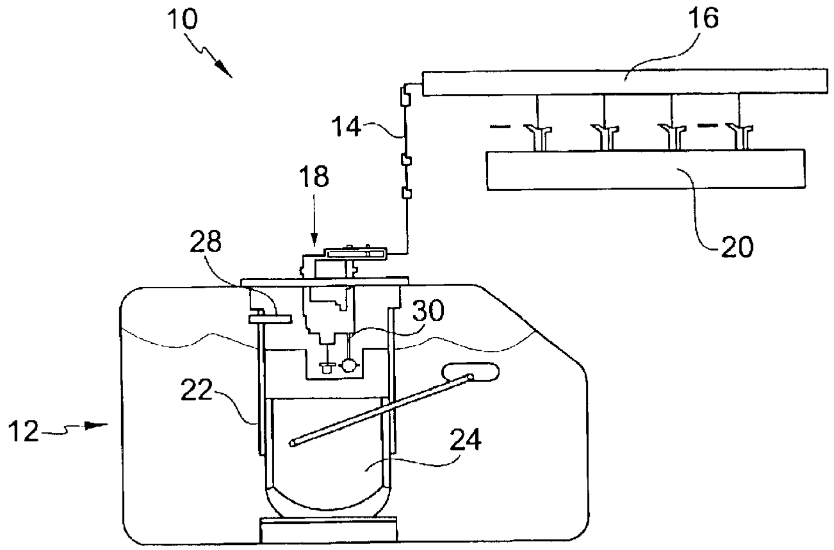

Referring to FIG. 1, a first embodiment of a fuel supply system 10 includes a fuel tank 12, a fuel line 14, an injector rail 16, and a pump module 18. The pump module 18 is mounted to the fuel tank 12 and extends through an opening in the fuel tank 12 to pump and filter fuel from the fuel tank 12 through the fuel line 14 to the injector rail 16. The injector rail 16 can be placed in fluid communication with an internal combustion engine 20.

The pump module 18 includes a housing 22 that contains a pump 24 in fluid communication with the fuel tank 12, a filter 26 in fluid communication with the pump 24 and the fuel line 14, and a fuel pressure regulator 28 in fluid communication with the filter 26. The pump 24 draws fuel contained in the fuel tank 12 and sends the fuel through the filter 26 and then on to the injector rail 16 by way of the fuel line 14. Fuel sent to the filter 26 is also fed to the fuel pressure regulator 28, which limits the maximum pressure of the fuel sent to the injector rail 16 by selectively opening fluid communication between the filter 26 and a regulator outlet 30, as will be explained in detail below.

The pump 24, filter 26 and the fuel pressure regulator 28 can be assembled in the fuel supply system 10 by inserting the pump module 18 into the fuel tank 12 through the opening in the fuel tank and then connecting the fuel line 14 to the pump module 18. Thus, the pump module 18 can reduce the process time and the number of components for final assembly of the fuel supply system 10.

Also, the pump module 18 advantageously reduces fuel leakage if the fuel pressure regulator 28 fails. The regulator outlet 30 opens inside the housing 22. The fuel pressure regulator 28 empties over-pressure fuel into housing 22 by placing the regulator outlet 30 in fluid communication with the filter 26. As will be explained in detail below, the fuel pressure regulator 28 normally blocks fluid communication between the filter 26 and the regulator outlet 30. If the fuel pressure regulator 28 fails, then fluid communication will be open between the filter 26 and the regulator outlet 30. Any fuel that passes through the regulator outlet 30 can be collected in the housing 22 and can be recirculated by the pump 24 to the filter 26 and then on to the injector rail 16.

Figure 2:
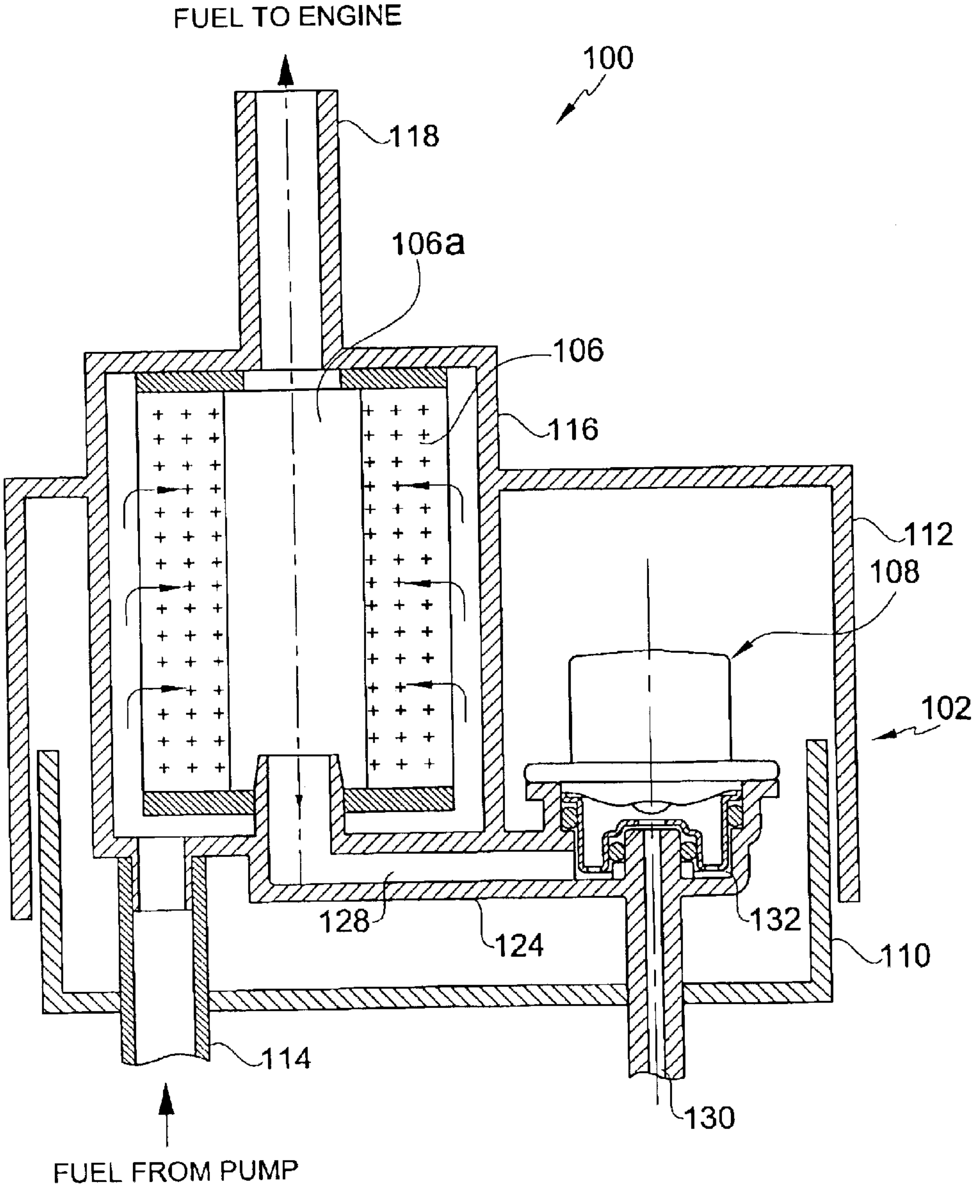

FIG. 2 illustrates a first embodiment of a pump module 100 schematically represented in FIG. 1. The pump module 100 includes a housing 102, which contains a pump 104, a filter 106 and a fuel pressure regulator 108. The housing 102 includes a lower housing 110 and an upper housing 112 connected to the lower housing 110. The lower housing 110 includes a module inlet 114. The pump 104 is mounted in the lower housing 110 and in fluid communication with the module inlet 114. The upper housing 112 includes a filter housing 116, a module outlet 118 in fluid communication with the filter housing 116, and a mounting flange 120. The filter 106 is contained in the filter housing 116. The mounting flange 120 is connected to a fuel tank (not shown) and supports the pump module 100 in the fuel tank.

A pump conduit 122 and a pressure regulator conduit 124 provide fluid communication between the pump 104, the filter 106 and the pressure regulator 108. The pump conduit 122 is connected at one end to the pump 104 and at the other end to a filter inlet 126 connected to the filter housing 116. The pressure regulator conduit 124 includes a regulator inlet 128, a regulator outlet 130, a receptacle 132. The regulator inlet 128 extends into the filter housing 116 and into a filter passage **106*a* extending through the filter 106. The receptacle 132 is positioned between and in fluid communication with the regulator inlet 128 and the regulator outlet 130**.

The pump 104 sends fuel through the pump conduit 122 and into the filter cavity **116*a* by way of the filter inlet 126. The fuel then passes through the filter 106, which removes undesirable debris from the fuel and exits the filter housing 106 through the module outlet 118 and the regulator outlet 128. The pressure regulator 108 is mounted in the receptacle 132 and normally blocks fluid communication between the regulator inlet 128 and the regulator outlet 130. As will be explained in detail below, the pressure regulator conduit 124 and the pressure regulator 108 are configured to reduce noise and improve pressure regulation performance. A simplified and compact sealing arrangement prevents undesired fuel leakage between the receptacle 132 and the pressure regulator 108**, as will be explained in detail below.

Figure 3:
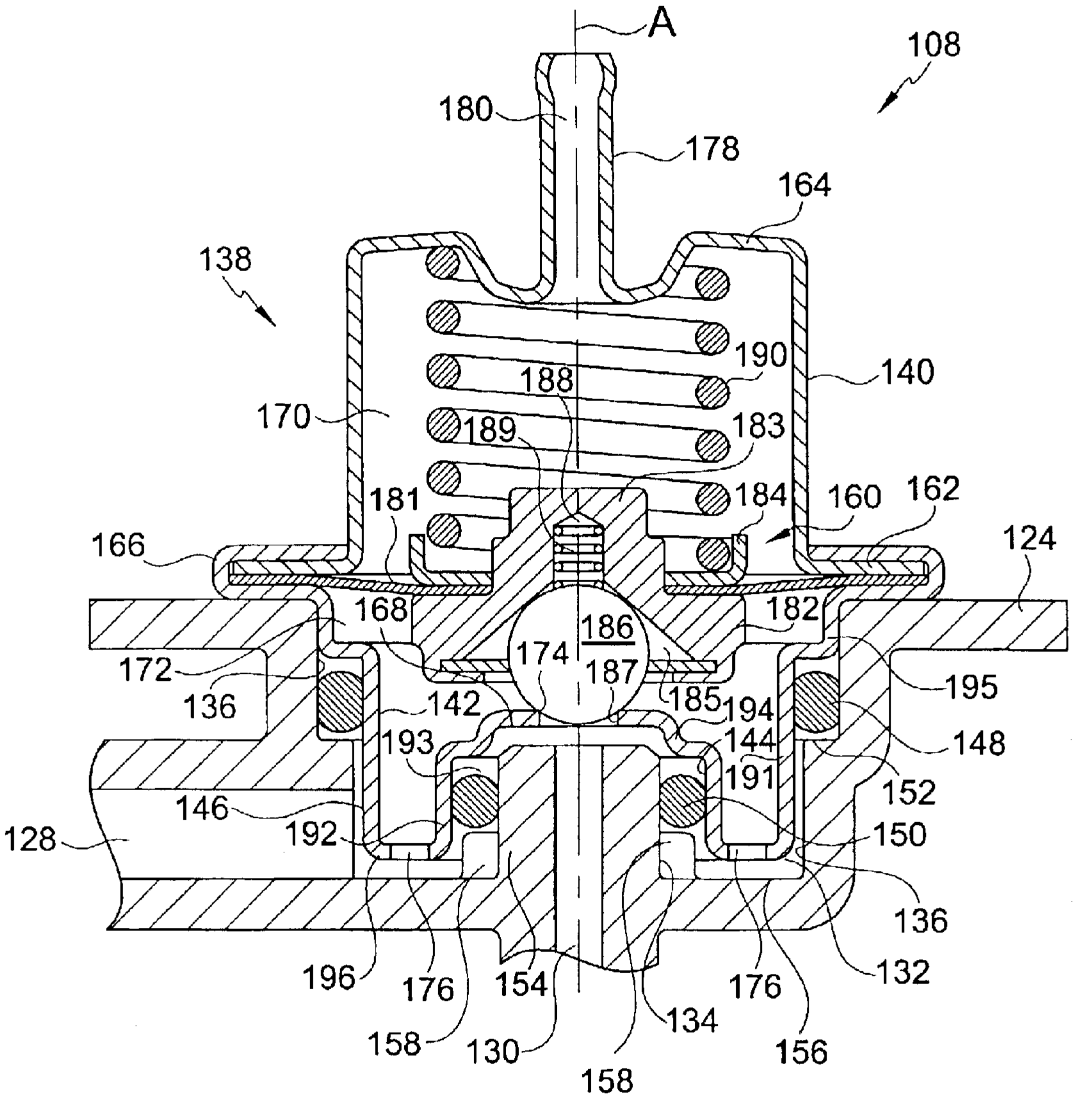
FIG. 3 is an enlarged cross-sectional view of a portion of FIG. 1 and showing the closing member in the closed position.

Referring to FIG. 3, the receptacle 132 includes a central axis A, an first surface 134, and an second surface 136 concentric with the first surface 134 about the central axis A. The first surface 134 faces away from the central axis A and the second surface 136 faces toward the central axis A. The second surface 136 is radially outward of and surrounds the first surface 134.

The fuel pressure regulator 108 is centered about the central axis A and includes a housing 138 having an upper housing 140 and a lower housing 142. The lower housing 142 is cylindrical and includes an third surface 144 and an fourth surface 146 concentric with the third surface 144 about the central axis A. The fourth surface 146 faces away from the central axis A and the third surface 144 faces toward the central axis A and the fourth surface 146 surrounds the third surface 144. The lower housing 142 extends between the second surface 136 of the receptacle 132 and the first surface 134 of the receptacle 132. The fourth surface 146 of the lower housing 142 is spaced from and opposes the second surface 136 of the receptacle 132. The third surface 144 of the lower housing 142 is spaced from and opposes the first surface 134 of the receptacle 132.

The fuel pressure regulator 108 is sealed in the receptacle 132 by an upper seal 148 and a lower seal 150. The upper seal 148 engages the second surface 136 of the receptacle 132 and the fourth surface 146 of the lower housing 142 and seals the space between these surfaces 136, 146. The lower seal 150 engages the first surface 134 of the receptacle 132 and the third surface 144 of the lower housing 142 and seals the space between these surfaces 134, 144. Preferably, the upper seal 148 and the lower seal 150 are O-rings.

Preferably, the second surface 136 of the receptacle 132 is cylindrical and centered about the central axis A. The second surface 136 of the receptacle 132 includes annular shelf 152 that provides a seat for the upper seal 148. Alternatively, the annular shelf 152 can be omitted and the second surface 136 of the receptacle 132 can have a constant diameter along the central axis A.

The receptacle 132 includes a projection 154 extending from the base 156 of the receptacle 132 toward the fuel pressure regulator 108. The first surface 134 of the receptacle 132 is located on the projection 154. Preferably, the projection 154 is cylindrical, centered on the central axis A, and extends approximately perpendicular to the regulator inlet 128. The regulator outlet 130 extends through the projection 154 along the central axis A. An opening in the projection 154 fluidly connects the regulator outlet 130 with the receptacle 132.

The receptacle 132 can include a plurality of blocks 158 formed at the base 156 of the receptacle 132 and adjacent to the projection 154 to provide a seat for the lower seal 150. The blocks 158 can be spaced about the circumference of the projection 154. Alternatively, a single ring can be provided at the base 156 of the receptacle 132 and adjacent to the projection 154 to provide the seat for the lower seal 150.

This seal assembly provides a compact arrangement as measured along the central axis A. Additionally, the retention of the upper seal 148 and the lower seal 150 does not require separate retaining rings to be mounted to the lower housing 142, thus minimizing the number of parts.

The pressure regulator 108 includes a diaphragm assembly 160 within the housing 138 that selectively places the regulator inlet 128 in fluid communication with the regulator outlet 130. The upper housing 140 is cylindrical, opened at one end, and includes a radial flange 162 at the opened end and a top 164 closing the other end. The lower housing 142 is opened at one end and includes a crimping flange 166 at the opened end and a base 168 at the other end. The opened ends of the upper housing 140 and the lower housing 142 are positioned adjacent each other and the diaphragm assembly 160 is crimped between the radial flange 162 and the crimping flange 166. The crimping flange 166 also extends around the radial flange 162 to secure the lower housing 142 to the upper housing 140. The diaphragm assembly 160 divides the interior of the housing 138 into a reference pressure chamber 170 and a fuel pressure chamber 172.

The base 168 of the lower housing 142 includes a valve seat 174 and a plurality of fuel inlets 176 spaced about the circumference of the base 168. The valve seat 174 is aligned with the opening in the projection 154 along the central axis A and spaced from the projection 154 along the central axis A when the fuel pressure regulator 108 is received in the receptacle 132. The fuel inlets 176 are in fluid communication with the fuel pressure chamber 172 and the receptacle 132. A reference pressure inlet 178 extends from the top 164 of the upper housing 140 and includes a cylindrical passage 180 in fluid communication with the reference pressure chamber 170.

The diaphragm assembly 160 includes a flexible annular diaphragm 181 having an third portion crimped between the radial flange 162 and the crimping flange 166 to secure the diaphragm assembly 160 to the housing 138. The inner portion of the diaphragm 181 is crimped between a radial flange 182 of a support member 183 and a retainer plate 184 to secure the diaphragm 181 to the support member 183.

The support member 183 includes a recess 185 that receives a valve closing member 186. Preferably, the valve closing member 186 is a sphere. The base 168 of the lower housing 142 includes an orifice 187 in fluid communication with the opening in the projection 154. Preferably, the orifice 187 centered about the central axis A. The valve closing member 186 mates with the valve seat 174 to seal off the orifice 187 and thereby the regulator outlet 130. The support member 183 includes a bore 188 centered on the recess 185. The bore 188 contains a spring 189 that biasingly engages the valve closing member 186. The interaction of the valve closing member 186 with the recess 185 and the spring 189 ensures that the valve closing member 186 is properly aligned with the valve seat 174 to fluidly seal the regulator outlet 130 from the regulator inlet 128.

A spring 190 between the upper housing 140 and the diaphragm assembly 160 biases the diaphragm assembly 160 into sealing engagement with the valve seat 174 to block the flow of fuel from the fuel inlets 176 to the orifice 187, thus fluidly sealing the regulator outlet 130 from the regulator inlet 128. Fuel entering the fuel inlets 176 applies a pressure to diaphragm assembly 160. When the fuel pressure exceeds a threshold value, the diaphragm assembly 160 lifts off the valve seat 174, against the bias of the spring 190, to open the orifice 187, thus placing the regulator outlet 130 in fluid communication with the regulator inlet 128. The over-pressurized fuel then passes through the regulator outlet 130 and is collected in the housing 102, where it can be pumped back to the filter 106 by the pump 104.

The spring 190 determines the over-pressure value at which of the fuel pressure regulator 108 operates. This permits a modular design for the regulator 108 in which the spring 190 is the only part of the fuel pressure regulator 108 that needs to be altered to meet different operating parameters. This preferred embodiment approach provides a family of fuel pressure regulators 108 having different pressure control values. The diaphragm 181 can be made from rubber or other elastic material sufficient to withstand the chemical effects of the fuel and provide the requisite elasticity, such as nitrile, fluorocarbon rubber and fluorosilicon rubber. This reduces manufacturing inventory, assembly complexity and cost.

The valve seat 174 is configured to match the shape of the valve closing member 186. Preferably, the valve seat 174 is integrally formed with the base 168 of the lower housing 142. The valve seat 174 can be coined onto the base 168 of the lower housing 142. This construction can permit the valve seat 174 to be provided simultaneously with the formation of the base 168 and then coined in a subsequent process. Thus, it is not necessary to form the valve seat as a separate member and then subsequently secure the valve seat 174 to the lower housing 142. This promotes a minimum number of assembly steps and components for the manufacturing of the regulator 108.

Fuel from the filter 106 enters the regulator 108 through the regulator inlet 128 and applies a pressure against the diaphragm 181. When this applied pressure exceeds the threshold value, called over-pressure, the diaphragm 181 resiliently deflects toward the upper housing 140 to raise the valve closing member 186 off the valve seat 174 (as shown in FIG. 2). Fuel can then escape the from fuel line 14 through the regulator outlet 130, thus lowering the fuel pressure in the fuel line 14 into the requisite operating pressure range. Thus, the pressure regulator 108 prevents over-pressurized fuel from reaching the injector rail 16 (FIG. 1). Also, by advantageously locating the fuel pressure regulator 108 and the regulator outlet 132 within the housing 102, if a component of the fuel pressure regulator 108 should fail, then over-pressurized fuel from the pump 104 can be contained within the pump module 108.

It is believed that, generally, the yield strength of the diaphragm 181 is exceeded only under rare over-pressure conditions. This is because the over-pressure in all but these rare over-pressures is sufficiently reduced below the yield strength of the diaphragm 181 when the valve closing member 186 opens the orifice 187 to permit excess fuel to escape the fuel line 14 by way of the regulator outlet 130.

The lower housing 142 includes an outer cylindrical wall 191 extending between the base 168 and the crimping flange 166. The base 168 of the lower housing 142 includes an inner cylindrical wall 192 surrounding a recess 193 centered in the base 168. The projection 154 extends into the recess 193 when the pressure regulator 108 is mounted in the receptacle 132. The third surface 144 of the lower housing 142 is located on the cylindrical face of the inner cylindrical wall 192 and forms a portion of the recess 193. The base 168 is configured to provide the recess 193 with a recess base having a depression and an annular step 194 surrounding the depression.

The lower seal 150 is captured between the annular step 194 and the plurality of blocks 158 when the pressure regulator 108 is mounted in the receptacle 132. By providing the annular step 194 on the base, there it is not necessary to place a additional retainer ring above the lower seal 150 to retain the lower seal 150 in the desired location between the lower housing 142 and the projection 154. Thus, the number of parts for the seal assembly can be reduced.

The outer cylindrical wall 191 of the lower housing 142 includes the fourth surface 146 of the lower housing 142 and an annular step 195 connecting the fourth surface 146 to the crimping flange 166. The upper seal 148 is captured between the annular step 195 and the annular shelf 152 when the pressure regulator 108 is mounted in the receptacle 132.

The base 168 of the lower housing 142 includes an end wall 196 connecting the outer cylindrical wall 191 and the inner cylindrical wall 192. Preferably, the end wall 196 extends radially relative to the central axis A. The fuel inlets 176 extend through and are circumferential spaced about the end wall 196.

The pressure regulator conduit 124 further includes a support flange 197 surrounding the receptacle 132. The crimping flange 166 of the lower housing 142 contacts the support flange 197 when the fuel pressure regulator 108 is mounted in the receptacle 132. The length of the lower housing 142 measured along the central axis A is less then the depth of the receptacle 132 measured along the central axis A. The support flange 197 supports the housing 138 so that the end wall 196 of the lower housing 142 is spaced from the base 156 of the receptacle 132.

The lower housing 142 can be a stamped metal piece in which the crimping flange 166, the base 168, the valve seat 174, and the outer cylindrical wall 191 are integrally formed on the lower housing 142 during the stamping process. In this stamped metal lower housing 142, the opening, the valve seat 174, the fuel inlets 176, the inner cylindrical wall 192, the recess 193, the annular step 194, and the end wall 196 are incorporated into the base 168 and the crimping flange 166 and the annular step 195 are incorporated into the outer cylindrical wall 191. By stamping the lower housing 142 from a single piece of sheet metal, the base 168 and the outer cylindrical wall 191 are incorporated into a continuous housing member to provide the lower housing 142. This can simplify the assembly process by manufacturing because these features can be formed simultaneously by a single stamping process. Further, this integral assembly can reduce the number of parts for assembling the pump module 100

Providing the regulator outlet 130 as a component of the receptacle 132 instead of the housing 138 permits integration of the regulator outlet 130 and the regulator inlet 128 with the receptacle 132. The regulator inlet 128, the regulator outlet 130, the receptacle 132, and the projection 154 can be integrally formed by an injection molding process. This can reduce the cost and the number of parts for assembling the pump module 100. The regulator outlet 130 can be integrally molded in a near net shape or a net shape so that minimal or no further machining will be required.

It is believed that the geometry of the regulator outlet 130 impacts the noise and the pressure regulation performance of the pump module 100. Preferably, the regulator outlet 130 has geometry that reduces noise and improves pressure regulation. In the first embodiment of the pump module 100 illustrated in FIG. 3, the regulator outlet 130 has a constant diameter along the central axis A to provide a straight passage through the extension. Alternatively, other configurations of the regulator outlet 130 are possible, such as that shown in FIG. 4.

Figure 4:
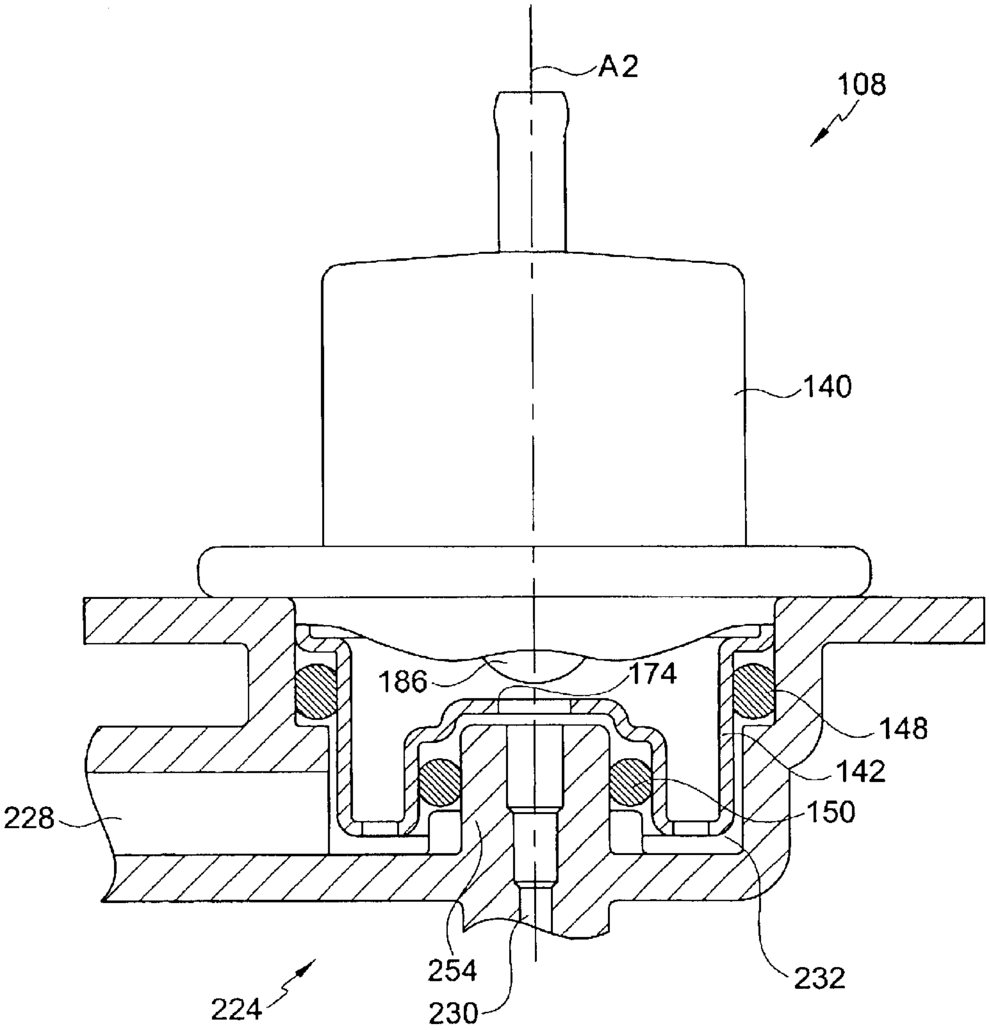
FIG. 4 is a cross-sectional view of a second embodiment of a pressure regulator conduit and showing the valve closing member in the opened position.

FIG. 4 illustrates a second embodiment of a regulator conduit 224 that includes a regulator inlet 228, a regulator outlet 230, a receptacle 232, and a central axis A2. The regulator conduit 224 includes a fuel pressure regulator 108 and sealing arrangement as described above with reference to FIGS. 2 and 3. The receptacle 232 is positioned between and in fluid communication with the regulator inlet 228 and the regulator outlet 230. The pressure regulator 108 is mounted in the receptacle 232 and normally blocks fluid communication between the regulator inlet 228 and the regulator outlet 230. The regulator conduit 224 is configured to reduce noise and improve pressure regulation performance.

The receptacle 232 includes a projection 254 and the regulator outlet 230 extends through the projection 254. The regulator outlet 230 is tapered and preferably includes three sequentially decreasing stepped diameters. The stepped diameters decrease in size in the direction along the central axis A2 away from the lower housing 142 of the fuel pressure regulator 108. Alternatively, the bore of the regulator outlet 230 can have any number of stepped diameters greater than two. In a further alternate embodiment, the bore of the regulator outlet 230 can have a smooth taper along the central axis A2.

As with the first embodiment of FIGS. 2 and 3, providing the regulator outlet 230 as a component of the receptacle 232 instead of the housing 138 permits integration of the regulator outlet 230 and the regulator inlet 228 with the receptacle 232. The regulator inlet 228, the regulator outlet 230, the receptacle 232, and the projection can be integrally formed by an injection molding process. This can reduce the cost and the number of parts for pump module 100. The regulator outlet 230 can be integrally molded in a near net shape or a net shape so that minimal or no further machining will be required.

In comparing the embodiments of the fuel pressure regulator assembly of FIGS. 3 and 4, it is apparent that integration of the regulator outlet 130, 230 with the receptacle 132, 232 permits a modular assembly where different noise suppression requirements can be met without modification to the fuel pressure regulator 108. Instead, the geometry of the regulator outlet 130, 230 can be configured to provide the requisite noise suppression. This provides for a modular approach to the pump module 100 where a common fuel pressure regulator 108 can be combined with various configurations of the regulator outlet 130, 230 to meet various noise suppression requirements. This also can reduce manufacturing overhead because the number of different fuel pressure regulators 108 can be minimized without compromising noise suppression capabilities.

Figure 5:
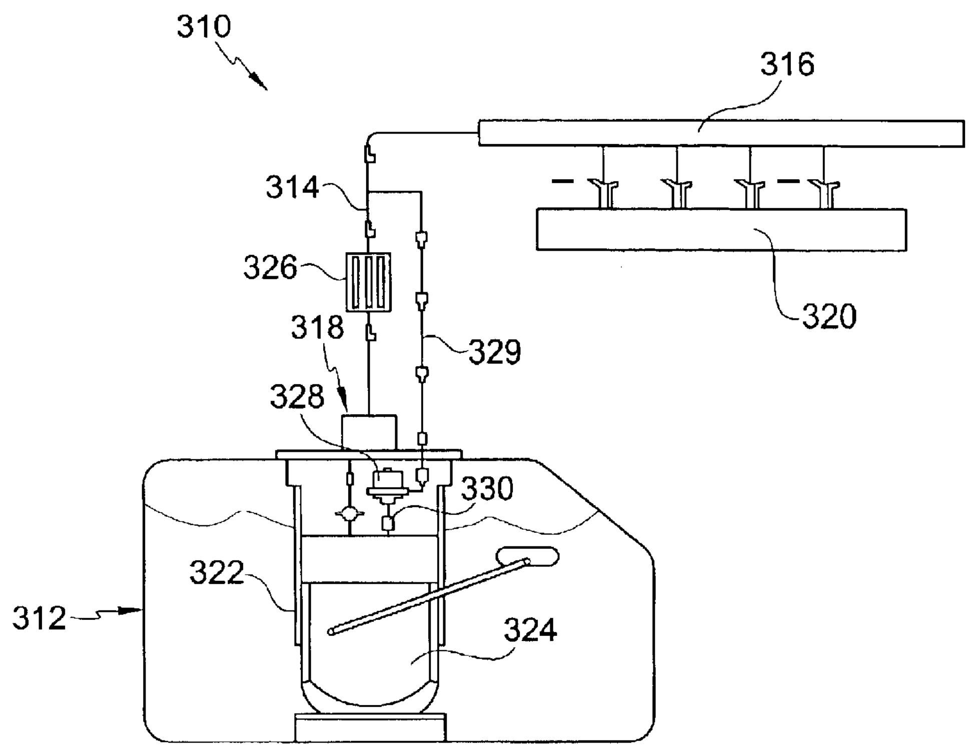
FIG. 5 is a schematic representation of a fuel supply system including a second embodiment of a pump module according to the invention.
Figure 6:
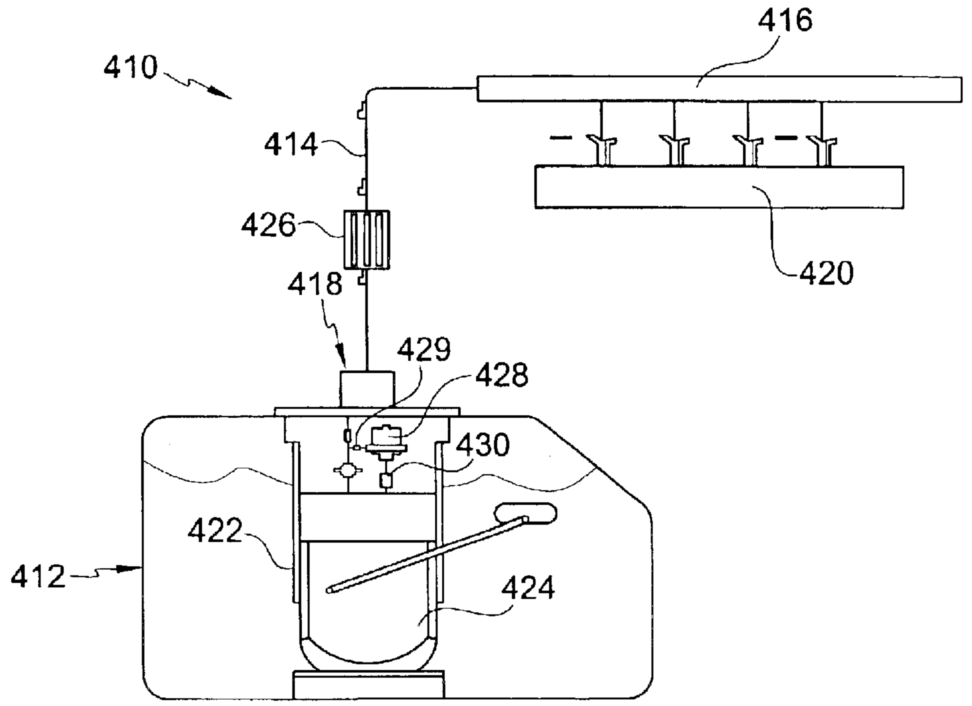
FIG. 6 is a schematic representation of a fuel supply system including a third embodiment of a pump module according to the invention.

FIGS. 5 and 6 illustrate alternate embodiments of the fuel supply system 10 shown in FIG. 1. In each of these alternate embodiments, the filter 326, 426 is located externally of the pump module 318, 418. However, additional features of these alternate embodiments are similar to the fuel supply system 10 of the first embodiment.

With reference to FIG. 5, a second embodiment of a fuel supply system 310 includes a fuel tank 312, a fuel line 314, an injector rail 316, and a pump module 318. The pump module 318 is mounted to the fuel tank 312 and extends through an opening in the fuel tank 312 to pump and filter fuel from the fuel tank 312 through the fuel line 314 to the injector rail 316. The injector rail 316 can be placed in fluid communication with an internal combustion engine 320. A filter 326 inserted in the fuel supply line 314 at a position intermediate the pump module 318 and the injector rail 316.

The pump module 318 includes a housing 322 that contains a pump 324 in fluid communication with the fuel tank 312 and a fuel pressure regulator 328 in fluid communication with the filter 326. The pump 324 draws fuel contained in the fuel tank 312 and sends the fuel through the filter 326 and then on to the injector rail 316 by way of the fuel line 314. Fuel sent to the filter 326 is also fed to the fuel pressure regulator 328 by way of a regulator inlet 329 in fluid communication with the fuel supply line 314 at a position downstream from the filter 326. The regulator inlet 329 is a part of a regulator conduit. The regulator conduit also includes a regulator outlet 330. As previously discussed, the fuel pressure regulator 328 normally closes fluid communication between the regulator inlet 329 and the regulator outlet 330. When over-pressurized fuel enters the fuel pressure regulator 328, the fuel pressure regulator 328 opens fluid communication between the regulator inlet 329 and the regulator outlet 330. The structure of the regulator conduit and the fuel pressure regulator 328 can be similar to the regulator conduit 124, 224 and the fuel pressure regulator 108 described above with reference to FIGS. 3 and 4.

The pump 324 and the fuel pressure regulator 328 can be assembled in the fuel supply system 310 by inserting the pump module 318 into the fuel tank 312 through the opening in the fuel tank and then connecting the fuel line 314 to the pump module 318. Thus, the pump module 318 can reduce the process time and the number of components for final assembly of the fuel supply system 310.

Also, the pump module 318 advantageously reduces fuel leakage if the fuel pressure regulator 328 fails. The regulator outlet 330 opens inside the housing 322. The fuel pressure regulator 328 empties over-pressure fuel into housing 322 by placing the regulator outlet 330 in fluid communication with the filter 326. If the fuel pressure regulator 328 fails, then fluid communication will be open between the filter 326 and the regulator outlet 330. Any fuel that passes through the regulator outlet 330 can be collected in the housing 322 and can be recirculated by the pump 324 to the filter 326 and then on to the injector rail 316.

With reference to FIG. 6, a third embodiment of a fuel supply system 410 includes a fuel tank 412, a fuel line 414, an injector rail 416, and a pump module 418. The pump module 418 is mounted to the fuel tank 412 and extends through an opening in the fuel tank 412 to pump and filter fuel from the fuel tank 412 through the fuel line 414 to the injector rail 416. The injector rail 416 can be placed in fluid communication with an internal combustion engine 420. A filter 426 inserted in the fuel supply line 414 at a position intermediate the pump module 418 and the injector rail 416.

The pump module 418 includes a housing 422 that contains a pump 424 in fluid communication with the fuel tank 412 and a fuel pressure regulator 428 in fluid communication with the filter 426. The pump 424 draws fuel contained in the fuel tank 412 and sends the fuel through the filter 426 and then on to the injector rail 416 by way of the fuel line 414. Fuel sent to the filter 426 is also fed to the fuel pressure regulator 428 by way of a regulator inlet 429 in fluid communication the pump 424. The regulator inlet 429 is a part of a regulator conduit. The regulator conduit also includes a regulator outlet 430. As previously discussed, the fuel pressure regulator 428 normally closes fluid communication between the regulator inlet 429 and the regulator outlet 430. When over-pressurized fuel enters the fuel pressure regulator 428, the fuel pressure regulator 428 opens fluid communication between the regulator inlet 429 and the regulator outlet 430. The structure of the regulator conduit and the fuel pressure regulator 428 can be similar to the regulator conduit 124, 224 and the fuel pressure regulator 108 described above with reference to FIGS. 3 and 4.

The pump 424 and the fuel pressure regulator 428 can be assembled in the fuel supply system 410 by inserting the pump module 418 into the fuel tank 412 through the opening in the fuel tank and then connecting the fuel line 414 to the pump module 418. Thus, the pump module 418 can reduce the process time and the number of components for final assembly of the fuel supply system 410.

Also, the pump module 418 advantageously reduces fuel leakage if the fuel pressure regulator 428 fails. The regulator outlet 430 opens inside the housing 422. The fuel pressure regulator 428 empties over-pressure fuel into housing 422 by placing the regulator outlet 430 in fluid communication with the filter 426. If the fuel pressure regulator 428 fails, then fluid communication will be open between the filter 426 and the regulator outlet 430. Any fuel that passes through the regulator outlet 430 can be collected in the housing 422 and can be recirculated by the pump 424 to the filter 426 and then on to the injector rail 416.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What we claim is:

1. A pump module for mounting in a fuel tank of an automotive fuel supply system comprising:

a housing including a module inlet, a module outlet, and a pressure regulator conduit, the pressure regulator conduit including a regulator inlet, regulator outlet, and a receptacle in fluid communication with the regulator inlet and the regulator outlet, the receptacle including a first surface surrounding an axis, and a second surface surrounding the axis and the first surface to provide a void between the first surface and the second surface;

a pressure regulator mounted in the receptacle to selectively open fluid communication between the regulator inlet and the regulator outlet, the pressure regulator extending into the void between the first surface of the receptacle and the second surface of the receptacle, the pressure regulator including a third surface surrounding the axis, and a fourth surface surrounding the axis and the third surface;

a first seal engaging the first surface of the receptacle and the third surface of the pressure regulator;

a second seal engaging the second surface of the receptacle and the fourth surface of the pressure regulator; and a fuel pump mounted in the housing and in fluid communication with the module inlet, the module outlet and the regulator inlet.

2. The pump module according to claim 1, wherein the housing further comprises a filter housing in fluid communication with the fuel pump, the module outlet and the regulator inlet, the filter housing including a filter cavity, and a fuel filter received in the filter cavity such that the pressure regulator regulates the pressure of filtered fuel.

3. The pump module according to claim 2, wherein the regulator inlet includes a first end extending into the filter cavity and a second end extending away from the filter housing, the receptacle proximate the second end of the regulator inlet.

4. The pump module according to claim 1, wherein the pressure regulator further comprises a base including a recess and a face extending radially relative to the axis, the face including a fuel base including a recess and a face extending radially relative to the axis, the face including a fuel inlet in fluid communication with the regulator inlet;

the receptacle further includes a projection extending along the axis and into the recess, the regulator outlet extends through the projection; and the first seal being intermediate the second seal and the radial face along the axis.

5. The pump module according to claim 1, wherein the third surface of the pressure regulator includes a annular step extending toward the axis;

the receptacle further includes a base and a seal seat extending from the first surface of the receptacle and adjacent the base;

the first seal is intermediate the seal seat and the annular step of the third surface; and the fourth surface includes an annular step extending away from the axis, and the second seal is located adjacent the annular step of the fourth surface.

6. The pump module according to claim 5, wherein the seal seat comprises a plurality of blocks spaced about the perimeter of the first surface of the receptacle.

7. The pump module according to claim 1, wherein the regulator outlet has a constant diameter along the axis sized to minimize noise as fuel passes through the outlet.

8. The pump module according to claim 1, wherein the regulator outlet has a diameter that decreases in discrete steps along the axis in a direction away from the pressure regulator to minimize noise as fuel passes through the outlet.

9. A pump module for mounting in a fuel tank of an automotive fuel supply system comprising:

a housing including a module inlet and a module outlet in fluid communication with the module inlet;

a pump mounted in the housing and in fluid communication with the module inlet;

a pressure regulator conduit mounted in the housing and including a regulator inlet in fluid communication with the pump, a receptacle in fluid communication with the regulator inlet, and a regulator outlet extending along an axis into the receptacle; and a fuel pressure regulator sealingly mounted within the receptacle to selectively open and close fluid communication between the regulator inlet and the regulator outlet, the fuel pressure regulator including:

a first housing member;

a second housing member and connected to the first housing member and in fluid communication with the regulator inlet, the second housing member including a continuous wall, the continuous wall including:

a base;

a recess in the base and receiving the regulator outlet, the recess including a first surface surrounding the axis, an opening in the recess coaxial with the regulator outlet and in fluid communication with the regulator outlet;

a seat adjacent the opening and surrounding the opening; and a second surface surrounding the axis and the first surface; and a closing member movably contained within the first housing member and the second housing member and selectively engageable with the seat to fluidly seal the opening;

a first seal engaging the regulator outlet and the first seal surface; and a second seal engaging the receptacle and the second surface.

10. The pump module according to claim 9, wherein the pressure regulator further comprises:

a diaphragm assembly connected between the first housing member and the second housing member, the diaphragm assembly including the closing member; and a fuel pressure chamber housed by the diaphragm assembly and the second housing member;

11. The pump module according to claim 10, wherein the second housing further comprises a stamped metal cylindrical housing;

the base includes an annular wall portion encircling the recess and a radial wall portion connecting the first surface and the second surface, and a fuel inlet extends through the radial face and is in fluid communication with the fuel pressure chamber.

12. The pump module according to claim 11, wherein the first seal is intermediate the second seal and the radial face along the axis and the base includes an annular step radially spaced from the opening and adjacent the first seal to retain the first seal.

13. The pump module according to claim 12, wherein the second housing member comprises a stamped metal housing; and the seat includes a coined seat complimentary in shape to the closing member.

14. The pump module according to claim 13, wherein the closing member comprises a spherical body.

15. The pump module according to claim 9, wherein the regulator outlet comprises a passage having one of a straight configuration and a stepped configuration such that noise is reduced when fuel flows through the passage.

* * * * *